United States Patent [19]

Hastings, Jr.

[11] 3,872,951
[45] Mar. 25, 1975

[54] SPINDLE LOCKING MECHANISM FOR ROTARY POWER DEVICE

[75] Inventor: Charles Russell Hastings, Jr., Baltimore, Md.

[73] Assignee: The Black and Decker Manufacturing Company, Towson, Md.

[22] Filed: Nov. 6, 1973

[21] Appl. No.: 413,335

[52] U.S. Cl. ............... 188/69, 70/184, 74/527, 192/71, 279/1 K
[51] Int. Cl. ............................................. B62c 7/02
[58] Field of Search ............ 188/31, 60, 69; 192/71; 74/527, 528, 813 R; 279/1 K; 70/182, 183, 184, 185

[56] References Cited
UNITED STATES PATENTS

| | | | |
|---|---|---|---|
| 2,644,550 | 7/1953 | Flinn | 188/69 X |
| 3,021,723 | 2/1962 | Happe | 74/527 |

FOREIGN PATENTS OR APPLICATIONS

| | | | |
|---|---|---|---|
| 260,558 | 1/1927 | United Kingdom | 188/69 |

Primary Examiner—George E. A. Halvosa
Attorney, Agent, or Firm—Leonard Bloom; Edward D. Murphy; William Kovensky

[57] ABSTRACT

A locking mechanism is provided for a rotary power device which permits a rotatable spindle to be temporarily locked against rotation to allow accessories to be safely connected to and removed from the spindle. The locking mechanism includes a safety feature which prevents inadvertent actuation of the mechanism during normal power operation of the device to avoid injury to the operator and damage to the device.

14 Claims, 10 Drawing Figures

PATENTED MAR 25 1975
SHEET 1 OF 2
3,872,951
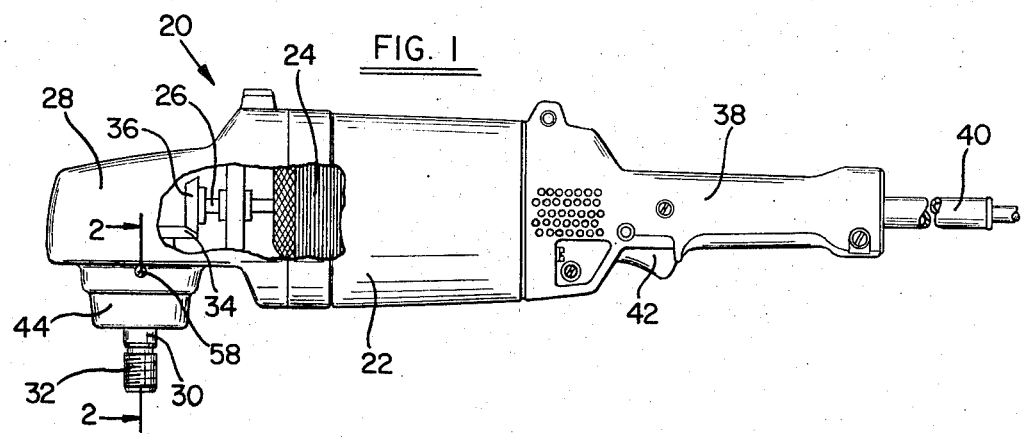
FIG. 1
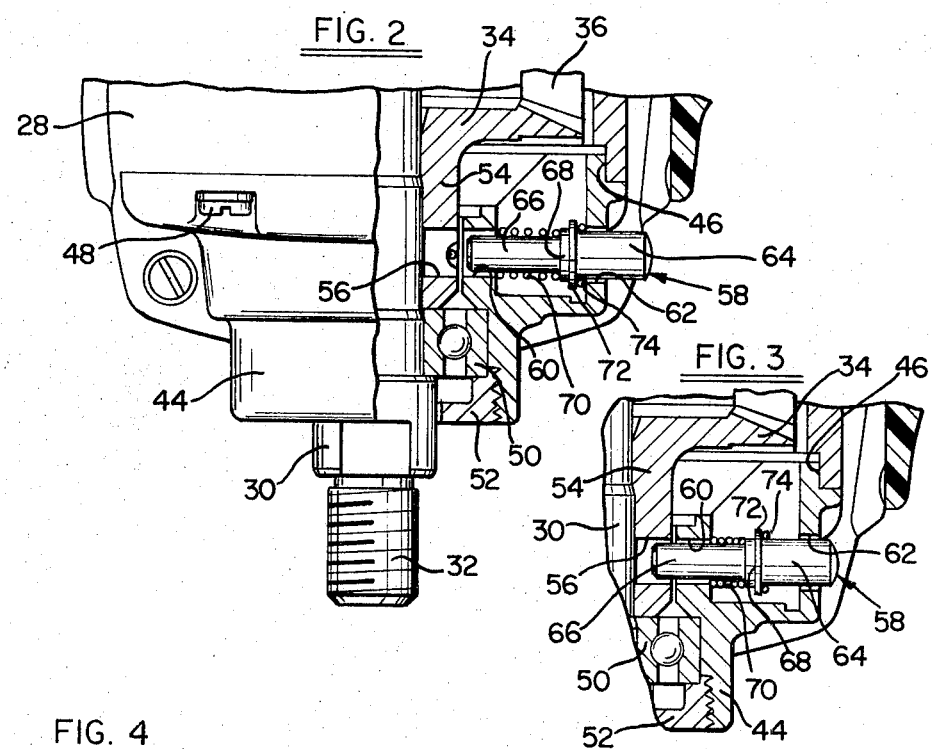
FIG. 2
FIG. 3
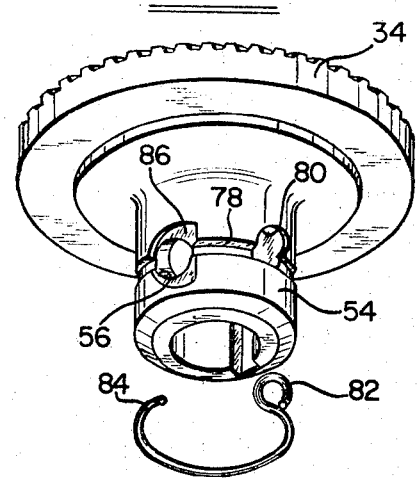
FIG. 4
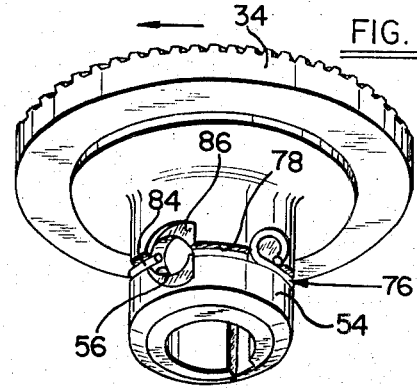
FIG. 5

SPINDLE LOCKING MECHANISM FOR ROTARY POWER DEVICE

The present invention relates to a locking mechanism for a rotary power device and, more particularly, to a manually operable locking mechanism for a rotary power tool which permits a rotatable spindle of the tool to be temporarily locked against rotation to allow attachments to be safely connected to and removed from the spindle.

In the field of rotary devices, e.g., hand operated electric drills, sanders, and polishers, it has been proposed to provide locking mechanisms which permit an operator to temporarily lock the device against rotation to allow safe handling of accessories, e.g., drill chucks, sanding discs, and polishing wheels, to be attached to and removed from the power devices. The proposed locking mechanisms have not, however, been generally acceptable because of the possibility of inadvertent actuation of the mechanisms during normal power operation of the devices with consequent disastrous results. For example, the susceptibility of the locking mechanisms to accidental actuation while the power device is operating has resulted in severe damage to the internal components of the device. In addition, the absence of any protection against accidental actuation of the locking mechanism has made it possible to abruptly lock the power device with resultant separation of attachments from the device to cause serious injury to the operator or to the work material.

It is, for reasons of safety, extremely desirable to provide a spindle locking mechanism for a rotary power device which enables the operator to temporarily lock the device against rotation for complete safety in assembly and disassembly of attachments. However, in view of the above disadvantages of a locking mechanism susceptible to inadvertent actuation during power operation of the device, it is essential to provide a safeguard against the potentially disastrous results of unintentional actuation of the locking mechanism during normal power operation of the device. Accordingly, it is a paramount safety requirement to provide a locking mechanism which cannot be inadvertently actuated during normal power operation of the device.

It is an object of the present invention to provide a spindle locking mechanism for a rotary power device which allows the device to be temporarily locked against rotation but avoids the danger of inadvertent actuation during normal power operation of the device.

It is another object of the invention to provide a spindle locking mechanism for a rotary power tool including a safeguard which is normally operative to prevent actuation of the locking mechanism during normal power operation of the tool and is only rendered inoperative by positive manual action, i.e., combined manipulation of the spindle and locking mechanism, to lock the spindle against rotation.

The present invention provides a locking mechanism for a rotary power device having a rotatable spindle. In accordance with the invention, the locking mechanism comprises a locking element carried by the spindle for rotation therewith, a locking member mounted adjacent to the spindle for movement toward and away from the locking element, the locking member being normally biased away from the locking element and manually movable into locking engagement with the locking element to prevent rotation of the spindle, and means normally operative for preventing movement of the locking member into locking engagement with the locking element during normal power operation of the spindle and rendered inoperative by movement of the locking member toward the locking element and manual rotation of the spindle to permit movement of said locking member into locking engagement with said locking element. In a preferred embodiment, the locking element includes a radially extending opening and the locking member is capable of manual movement into the opening to prevent rotation of the spindle. The preferred embodiment includes guard means normally operative to block the locking member from movement into the opening to permit free rotation of the spindle during normal power operation. The locking member is manually engageable with the guard means upon movement of the locking member toward the locking element and rotation of the spindle in a predetermined direction to render the guard means inoperative to prevent movement of the locking member into the opening.

The invention is specifically embodied as a manually operable locking mechanism for a rotary power tool including a housing which supports a motor and a rotatable spindle driven in a predetermined direction by the motor. The locking mechanism includes a gear member rigidly mounted on the spindle for coupling the spindle to the motor. The gear member includes a sleeve surrounding the spindle which is provided with a radially extending opening. A lock pin is slidably mounted on the housing adjacent to the sleeve for radial movement toward and away from the sleeve. The lock pin is normally biased away from the sleeve to permit rotation of the spindle by the motor and is manually movable toward the sleeve into the opening to prevent rotation of the spindle. A spring element surrounds the sleeve and includes a first end secured to the sleeve and a second end extending partially across the opening to normally prevent movement of the lock pin into the opening. The lock pin is laterally engageable with the second end of the spring element upon manual movement of the lock pin toward the sleeve and manual rotation of the spindle in a reverse direction to displace the second end of the spring element laterally relative to the opening to permit movement of the lock pin into the opening.

The invention achieves a locking mechanism which enables an operator to temporarily lock the spindle against rotation to allow assembly and disassembly of attachments on the spindle without the danger of inadvertent power operation of the tool. The locking mechanism provides distinct advantages over the prior art by incorporating a safeguard against inadvertent actuation of the mechanism during normal power operation of the tool. This safeguard minimizes the risk of injury to the operator and the possibility of damage to the tool and work material.

The accompanying drawings illustrate preferred embodiments of the invention and, together with the description, serve to explain the principles of the invention. In the drawing:

FIG. 1 is a side elevation of a rotary power tool, e.g., an electric sander or polisher, including a rotatable spindle driven by an electric motor and incorporating a spindle locking mechanism constructed in accordance with the invention;

FIG. 2 is an enlarged front elevation, partially in section, taken along line 2—2 of FIG. 1, illustrating a manually operable lock pin of the spindle locking mechanism in its normal, inoperative position to permit free rotation of the spindle;

FIG. 3 is a front section view illustrating the lock pin of the spindle locking mechanism of FIG. 2 in its operative position to prevent rotation of the spindle;

FIG. 4 is an exploded, perspective view of a gear member mounted on the spindle which transmits the rotary output of the motor to the spindle and serves as a component of the locking mechanism, and a spring element in the form of a wire which serves as a guard to prevent inadvertent operation of the locking mechanism during normal power operation of the tool;

FIG. 5 is a perspective view illustrating the assembled relationship of the gear member and spring wire of FIG. 4;

Figure 6:
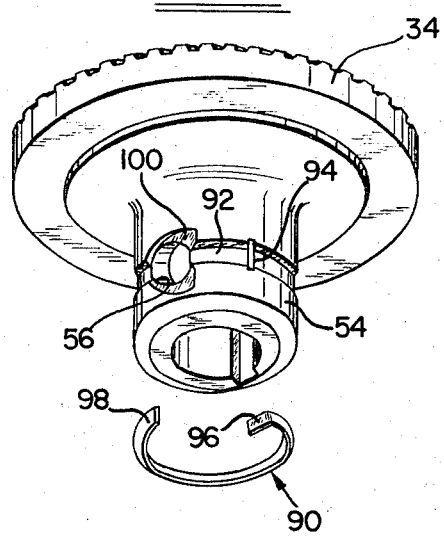
FIG. 6 is an exploded, perspective view illustrating an alternative embodiment of the gear member which incorporates a spring element in the form of a band to prevent inadvertent actuation of the locking mechanism during normal power operation of the tool.

Referring to FIG. 1, a rotary power tool 20, e.g., an electric sander or polisher, includes a motor housing 22, generally cylindrical in shape, which supports an electric motor 24 having an output shaft 26 extending axially relative to the motor housing. A spindle housing 28 is mounted at the front end of motor housing 22 and supports a rotatable spindle 30 oriented at right angles to output shaft 26 of the electric motor. Spindle 30 is provided with a lower, threaded end 32 which permits various attachments, e.g., sanding discs and polishing wheels, to be threadably connected to the spindle. A first gear member 34 is rigidly mounted on spindle 30 and meshes with a second gear member 36 mounted on output shaft 26 of the electric motor to couple the spindle to the motor.

A handle 38 is mounted at the rear end of motor housing 22 to permit the power tool to be manually gripped. An electric power cord 40 extends through the handle and is connected to the motor via a control switch (not shown) to permit the power tool to be coupled to a source of electric power. Handle 38 supports a manually operable trigger 42 which actuates the switch (not shown) to permit manual on-off control of the operation of the electric motor.

As shown in FIG. 2, spindle housing 28 includes a detachable, gear case cover 44, generally circular in shape, which is received in a circular opening 46 provided at the lower end of the spindle housing and secured to the housing by a plurality of bolts 48 (one shown). The lower end of cover 44 is adapted to support a bearing 50 which is held in place by a lock nut 52 threadably secured to the cover. Bearing 50 supports spindle 30 for rotation relative to the spindle housing and cover.

The present invention provides a locking mechanism which permits the spindle to be temporarily locked against rotation for safety in assembly and disassembly of attachments and includes a safeguard to prevent inadvertent actuation of the locking mechanism during normal power operation. The mechanism comprises a locking element carried by the spindle for rotation therewith and a movable locking member normally biased away from the locking element and manually movable into locking engagement with the locking element to prevent rotation of the spindle. In a preferred embodiment of the locking mechanism, the locking element includes a radially extending opening and the locking member is manually movable into the opening to lock the spindle against rotation.

Referring to FIGS. 2 and 4, the locking element is embodied as a sleeve 54 integrally formed as the hub of gear member 34 and provided with a radial opening 56 extending completely through the sleeve. As shown in FIG. 2, the lower end of sleeve 54 rests on bearing 50. The sleeve is press fit onto spindle 30 and, preferably, a woodruff key (not shown) is provided to couple the spindle and gear member.

Referring to FIGS. 2 and 3, the locking member is embodied as a lock pin 58 slidably mounted in radially aligned openings 60 and 62 formed in inner and outer walls of cover 44. Lock pin 58 includes a manually engageable button 64 extending radially outward through opening 62 in the outer wall of cover 44 and a shaft 66 extending radially inward into opening 60 in the inner wall of the cover. Shaft 66 is reduced in diameter relative to button 64 to provide an annular shoulder 68 on the lock pin located between the inner and outer walls of the cover.

A coil spring 70 is interposed between the inner wall of cover 44 and shoulder 68 to normally bias lock pin 58 radially outward away from opening 56 in sleeve 54 to permit free rotation of spindle 30 by the electric motor. An E-ring 72 is mounted on button 64 of the lock pin adjacent to shoulder 68 to limit the extend of outward movement of the lock pin under the action of coil spring 70. An O-ring 74 of resilient material is interposed between E-ring 72 and the outer wall of cover 44 to provide a cushion and reduce wear of the lock pin and outer wall of the cover.

In accordance with the invention, the locking mechanism includes means normally operative for preventing movement of the locking member into locking engagement with the locking element during normal power rotation of the spindle and rendered operative by movement of the locking member toward the locking element and manual rotation of the spindle to permit movement of the locking member into locking engagement with the locking member. This means is preferably embodied as displaceable or resilient guard means mounted on the locking element which normally extends into the opening in the locking element to block movement of the locking member into the opening. The locking member is engageable with the guard means upon movement of the locking member toward the locking element and rotation of the spindle in a predetermined direction to displace the guard means away from the opening to permit movement of the locking member into the opening.

In the preferred embodiment, the guard means comprises a spring element surrounding the sleeve of the gear member and including a first end secured to the sleeve and a second end extending partially across the opening to normally prevent movement of the lock pin into the opening. Referring to FIGS. 4 and 5, a spring element 76 in the form of a generally circular spring wire is received in a peripheral groove 78 extedning completely around sleeve 54 and intersecting opening 56. The sleeve is provided with a recess 80 displaced peripherally from opening 56 along groove 78. Spring element 76 includes a first end 82 bent into an appropriate shape which is received in recess 80 to anchor the spring element in the groove. Spring element 76 includes a second end 84 which, as shown in FIG. 5, extends partially across opening 56 to normally block movement of shaft 66 of lock pin 58 (FIG. 2) into the opening. The surface of sleeve 54 adjacent to opening 56 is undercut from the side of the opening opposite free end 84 of the spring element to provide a depression in the sleeve surface with a flat, bottom ledge 86.

Figure 7:
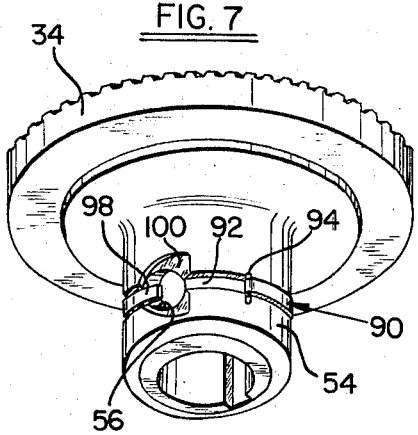
FIG. 7 is a perspective view illustrating the assembled relationship of the gear member and spring band of FIG. 6.

FIGS. 6 and 7 illustrate an alternative embodiment of the guard means of the locking mechanism. In the alternative embodiment, a spring element 90 in the form of a generally circular spring band is received in an enlarged peripheral groove 92 extending completely around sleeve 54 and intersecting opening 56. Sleeve 54 is provided with a slot 94 displaced peripherally from opeing 56 along groove 92. Spring element 90 includes a first bent end 96 which is received in slot 94 to anchor the spring element in the groove. A second free end 98 of the spring element extends partially across opening 56 to normally block movement of shaft 66 of lock pin 58 into the opening. The surface of sleeve 54 adjacent to opening 56 is undercut from the side of the opening opposite free end 98 of the spring element to provide a depression in the sleeve surface with a flat, bottom ledge 100.

Figure 8:
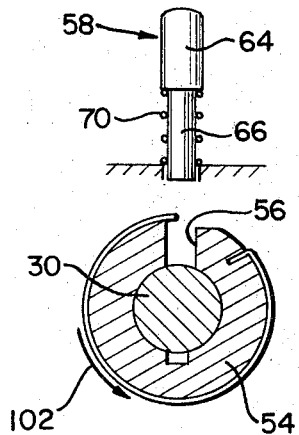
FIG. 8 is a diagrammatic view illustrating the configuration of the lock pin and spring element of the locking mechanism during normal power rotation of the spindle.
Figure 9:
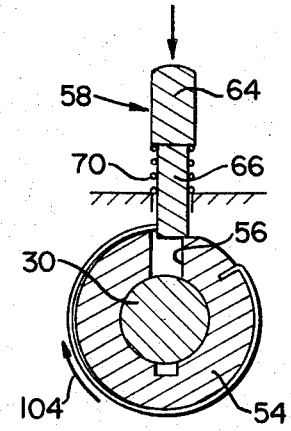
FIG. 9 is a diagrammatic view illustrating the configuration of the lock pin and spring element of FIG. 8 at the initiation of manual actuation of the locking mechanism.
Figure 10:
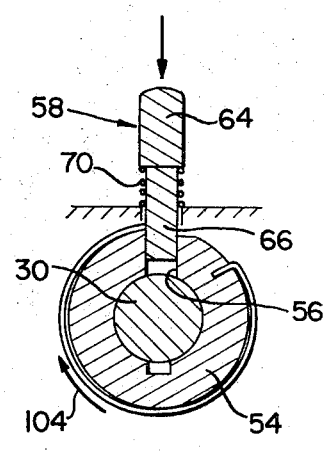
FIG. 10 is a diagrammatic view illustrating the configuration of the lock pin and spring element of FIG. 8 with the lock pin moved into locking engagement with the gear member.

FIGS. 8-10 illustrate diagrammatically the operation of the locking mechanism. The following description of operation is applicable to both the preferred embodiment of FIGS. 4 and 5 and the alternative embodiment of FIGS. 6 and 7.

Referring to FIG. 8, spindle 30 is driven by motor 24 in a predetermined, forward direction rotation, i.e., counterclockwise as indicated by arrow 102. The spring element extends in the opposite direction (clockwise) around sleeve 54 from its bent end to its free end. During normal power rotation of spindle 30, the free end of the spring element extends partially across opening 56 in sleeve 54 to block movement of shaft 66 of lock pin 58 into the opening.

When power rotation of spindle 30 is terminated, the locking mechanism permits the spindle to be temporarily locked against rotation for safety in interchanging of attachments. Referring to FIG. 9, the locking mechanism is actuated by manual depression of button 64 to move lock pin 58 into engagement with sleeve 54, and manual rotation of spindle 30 and sleeve 54 in the reverse direction, i.e., clockwise, as indicated by arrow 104. The inner end of shaft 66 moves into the depression 86 or 100 and engages the flat ledge adjacent to opening 56 while the side of shaft 66 engages the free end of the spring element. As shown in FIG. 10, upon further manual rotation of spindle 30 and sleeve 54 in the reverse direction, the free end of the spring element is displaced laterally relative to opening 56 to permit movement of shaft 66 of the lock pin into the opening. Thereafter, as long as button 64 of the lock pin is manually depressed, spindle 30 is locked against rotation.

When it is desired to release the locking mechanism, button 64 of lock pin 58 is manually disengaged. The lock pin returns to its inoperative position (FIG. 2) under the action of coil spring 70, and the spring element returns to its normal configuration (FIG. 8). Spindle 30 is thus free for power rotation by the electric motor.

The spindle locking mechanism of the present invention provides an essential safeguard against accidental actuation during normal power operation of the tool. The locking mechanism requires positive manual action by the operator, i.e., manual engagement of the lock pin and manual rotation of the spindle and sleeve in the reverse direction to render the locking mechanism operative to lock the spindle against rotation. It thus minimizes the possibility of substantial damage to the internal components of the power tool as a result of inadvertent movement of the lock pin into locking engagement with the sleeve during power rotation of the spindle. It also eliminates the danger of separation of attachments from the tool as a result of abrupt locking of the spindle and the resultant risk of serious injury to the operator or damage to the work material.

The invention in its broader aspects is not limited to the specific details shown and described, and modifications may be made in the details of the spindle locking mechanism without departing from the principles of the present invention.

What is claimed is:

1. A manually operable locking mechanism for a rotary power tool including a housing which supports a rotatable spindle, comprising:
a sleeve rigidly mounted on the spindle for rotation therewith, said sleeve including a radially extending opening:
a lock pin slidably mounted on the housing for movement toward and away from said sleeve, said lock pin being normally biased away from said sleeve and manually movable toward said sleeve into said opening to prevent rotation of the spindle; and
resilient guard means secured to said sleeve for rotation in common therewith and normally extending across said opening to prevent movement of said lock pin into said opening, said lock pin being engageable with said resilient guard means upon movement of said lock pin toward said sleeve and rotation of the spindle in a predetermined direction to displace said resilient guard means away from said opening to permit movement of said lock pin into said opening.

2. A manually operable locking mechanism for a rotary power tool including a housing which supports a rotatable spindle, comprising:
a sleeve rigidly mounted on the spindle for rotation therewith, said sleeve including a radially extending opening;
a lock pin slidably mounted on the housing for movement toward and away from said sleeve, said lock pin being normally biased away from said sleeve and manually movable toward said sleeve into said opening to prevent rotation of the spindle; and a spring element substantially surrounding said sleeve and including a first end secured to said sleeve and a second end normally extending across said opening to prevent movement of said lock pin into said opening, said lock pin being engageable with said second end of said spring element upon manual movement of said lock pin toward said sleeve and manual rotation of the spindle in a predetermined direction to displace said second end of said spring element away from said opening to permit movement of said lock pin into said opening.

3. A manually operable locking mechanism for a rotary power tool including a housing which supports a rotatable spindle, comprising:
  a sleeve rigidly mounted on the spindle for rotation therewith, said sleeve including a radially extending opening, a peripheral groove intersecting said opening, and a depression formed in said sleeve adjacent to said opening;
  a lock pin slidably mounted on the housing for movement toward and away from said sleeve, said lock pin being normally biased away from said sleeve and manually movable toward said sleeve and into said opening to prevent rotation of the spindle; and
  a spring element received in said peripheral groove of said sleeve, said spring element including a first end secured to said sleeve and a second end extending partially across said opening to normally prevent movement of said lock pin into said opening, said lock pin being movable into said depression upon manual movement of said lock pin toward said sleeve and manual rotation of the spindle in a predetermined direction to displace said second end of said spring element away from said opening to permit movement of said lock pin into said opening.

4. A manually operable locking mechanism for a rotary power tool including a housing which supports a rotatable spindle, comprising:
  a sleeve rigidly mounted on the spindle for rotation therewith, said sleeve including an opening extending radially therethrough, a peripheral groove extending completely around said sleeve and intersecting said opening, and a recess displaced peripherally from said opening along said groove, said sleeve being undercut from one side of said opening to provide a depression on said sleeve adjacent to said opening;
  a lock pin slidably mounted on the housing for movement toward and away from said sleeve, said lock pin being normally biased away from said sleeve and manually movable toward said sleeve into said opening to prevent rotation of the spindle; and
  a spring element received in said peripheral groove, said spring element including a first end located in said recess to anchor said spring element in said groove and a second end extending partially across said opening from the side thereof opposite to said depression to normally prevent movement of said lock pin into said opening, said lock pin being movable into said depression upon manual movement of said lock pin toward said sleeve and manual rotation of the spindle in a predetermined direction to laterally engage and displace said second end of said spring element relative to said opening to permit movement of said lock pin into said opening.

5. A manually operable locking mechanism for a rotary power tool including a housing which supports a motor and a rotatable spindle driven in a predetermined direction by the motor, comprising:
  a gear member rigidly mounted on the spindle for coupling the spindle to the motor, said gear member including an integral sleeve surrounding the spindle to support said gear member for rotation therewith, said sleeve including an opening extending radially therethrough;
  a lock pin slidably mounted on the housing adjacent to said sleeve for movement radially toward and away from said sleeve, said lock pin comprising a manually engageable portion extending radially outward through an opening provided in the housing and a shaft extending radially inward toward said sleeve, said shaft being movable into said opening to lock the spindle against rotation, said lock pin being normally biased radially outward away from said sleeve to permit rotation of the spindle by the motor; and
  a spring element substantially surrounding said sleeve of said gear member and including a first end secured to said sleeve and a second end extending partially across said opening to normally prevent movement of said shaft into said opening, said shaft being laterally engageable with said second end of said spring element upon manual movement of said lock pin toward said sleeve and manual rotation of the spindle in a reverse direction to displace said second end of said spring element laterally relative to said opening to permit movement of said shaft into said opening.

6. A manually operable locking mechanism for a rotary power tool including a housing which supports a motor and a rotatable spindle driven in a predetermined direction by the motor, comprising:
  a gear member rigidly mounted on the spindle for coupling the spindle to the motor, said gear member including an integral sleeve surrounding the spindle to support said gear member for rotation therewith, said sleeve including an opening extending radially therethrough, a peripheral groove extending completely around said sleeve and intersecting said opening, and a depression formed in said sleeve adjacent to said opening;
  a lock pin slidably mounted on the housing adjacent to said sleeve for movement radially toward and away from said sleeve, said lock pin comprising a manually engageable portion extending radially outward through the housing and a shaft extending radially inward toward said sleeve, said shaft being movable into said opening to lock the spindle against rotation, said lock pin being normally biased radially outward away from said sleeve to permit rotation of the spindle by the motor; and
  a spring element received in said peripheral groove of said sleeve, said spring element including a first end secured to said sleeve and a second end extending partially across said opening to normally prevent movement of said shaft into said opening said shaft being movable into said depression upon manual movement of said lock pin toward said sleeve and manual rotation of the spindle in a reverse direction to laterally engage and displace said second end of said spring element relative to said opening to prevent movement of said shaft into said opening.

7. A manually operable locking mechanism for a rotary power tool including a housing which supports a motor and a rotatable spindle driven in a predetermined direction by the motor, comprising:
- a gear member rigidly mounted on the spindle for coupling the spindle the motor, said gear member including an integral, generally cylindrical sleeve surrounding the spindle to support said gear member for rotation therewith, said sleeve including an opening extending radially therethrough, a peripheral groove extending completely around said sleeve and intersecting said opening, and a recess displaced peripherally from said opening said groove, said sleeve being undercut from one side of said opening to provide a depression in said sleeve adjacent to said opening;
- a lock pin slidably mounted on the housing adjacent to said sleeve for movement radially toward and away from said sleeve, said lock pin comprising a manually engageable portion extending radially outward through the housing and a shaft extending radially inward toward said sleeve, said shaft being movable into said opening to lock the spindle against rotation, said lock pin being normally biased radially outward away from said sleeve to permit rotation of the spindle by the motor; and
- a generally circular spring element received in said peripheral groove, said spring element including a first end located in said recess to anchor said spring element in said groove and a second end extending partially across said opening from the side thereof opposite to said depression to normally prevent movement of said shaft into said opening, said shaft being movable into said depression upon manual movement of said lock pin toward said sleeve and manual rotation of the spindle in a reverse direction to laterally engage and displace said second end of said spring element relative to said opening to permit movement of said shaft said opening.

8. A manually operable locking mechanism for a rotary power tool including a housing which supports a rotatable spindle, comprising:
- a sleeve rigidly mounted on the spindle for rotation therewith, said sleeve including a radially extending opening;
- a lock pin slidably mounted on the housing for movement toward and away from said sleeve, said lock pin being manually movable toward said sleeve into said opening to prevent rotation of the spindle; and
- resilient guard means secured to said sleeve for rotation in common therewith and normally extending across said opening to prevent movement of said lock pin into said opening, said lock pin being engageable with said resilient guard means upon movement of said lock pin toward said sleeve and rotation of the spindle in a predetermined direction to displace said resilient guard means away from said opening to permit movement of said lock pin into said opening.

9. Locking means for a rotating member which normally rotates in one direction comprising a radial opening formed in said rotating member, a lock pin normally biased away from said rotating member and movable towards said rotating member and into said opening to lock said rotating member against rotation so long as said pin is in said opening, resilient guard means mounted on said rotating member having first and second end portions, said first end portion being secured to said rotating member, and said guard means being wrapped about said rotating member from said first end portion in a direction opposite to said normal one direction of rotation of said rotating member, and said second end portion comprising a free end portion located over part of said opening to normally block the passage of said pin into said opening, said rotating member comprising means to guide said lock pin into said opening, whereby said lock pin may be positioned into said radial opening only by rotation of said rotating member in a direction to its normal direction of motion while simultaneously holding said lock pin depressed against said rotating member to cause the side of said lock pin to move said resilient guard means free end portion away from its guarding position overlying said radial opening to permit said lock pin to enter said opening.

10. The combination of claim 9, said guide means comprising a cut-out portion communicating the outside surface of said rotating member with said radial opening, whereby said cut-out portion guides said lock pin to move said free end away from said overlying guarding position.

11. The combination of claim 9, said resilient guard means comprising a spring wire of circular cross-sectional shape located in a peripheral groove shaped to receive said spring wire, and said groove surrounding said rotating member and intersecting said radial opening.

12. The combination of claim 11, said first secured end portion of said spring wire comprising a formed end thereof bent out of the plane defined by said groove and seated in a recess in the side of said rotating member, and said recess communicating with said groove.

13. The combination of claim 9, said resilient guard means comprising a flat spring element of rectilinear cross-sectional shape located in a peripheral groove shaped to receive said flat spring element, and said groove surrounding said rotating member and intersecting said radial opening.

14. The combination of claim 13, said first secured end portion of said spring element comprising a bent end thereof extending generally radially inwardly in the plane defined by said groove and seated in a slot formed in said member, and said slot communicating with said groove.

* * * * *

UNITED STATES PATENT OFFICE
CERTIFICATE OF CORRECTION

Patent No. 3,872,951          Dated March 25, 1975

Inventor(s) Charles Russell Hastings, Jr.

It is certified that error appears in the above-identified patent and that said Letters Patent are hereby corrected as shown below:

Column 2, line 58, "drawings" should read --drawing--.

Column 4, line 45, "extend" should read --extent--.

Column 5, line 10, "extedning" should read --extending--.

line 31, "opeing" should read --opening--.

Column 9, line 8, after "spindle" insert --to--.

line 15, after "opening" insert --along--.

line 41, after "shaft" insert --into--.

Signed and Sealed this

Fourteenth Day of September 1976

[SEAL]

Attest:

RUTH C. MASON
*Attesting Officer*

C. MARSHALL DANN
*Commissioner of Patents and Trademarks*